Jan. 28, 1964       C. A. CIBELIUS, JR., ETAL       3,119,956
CONTACTLESS TWO PHASE MOTOR CONTROL WITH LIMIT SWITCHING
Filed Sept. 16, 1959                        2 Sheets-Sheet 1
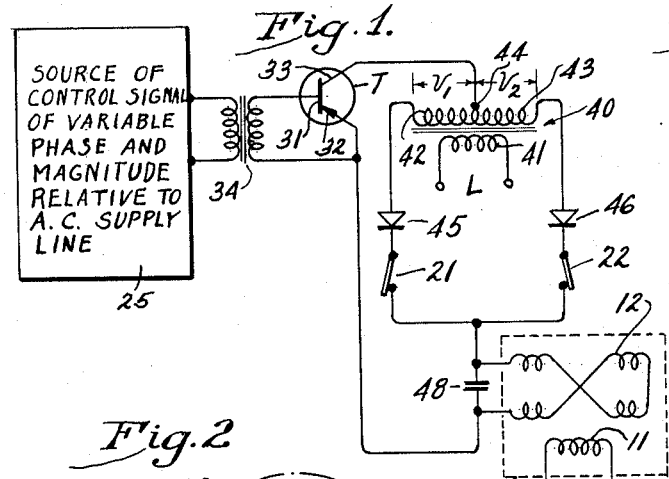
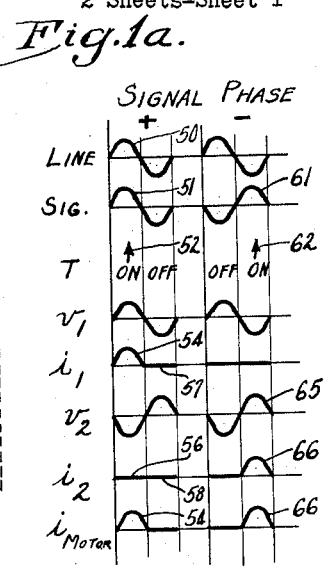
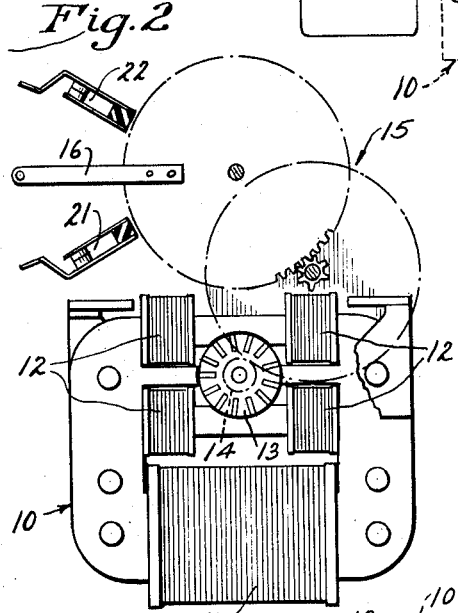
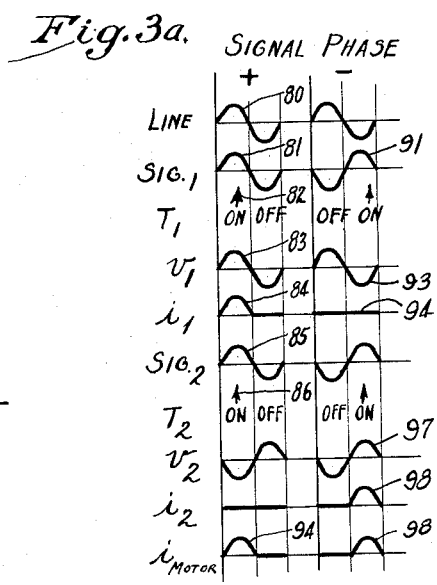
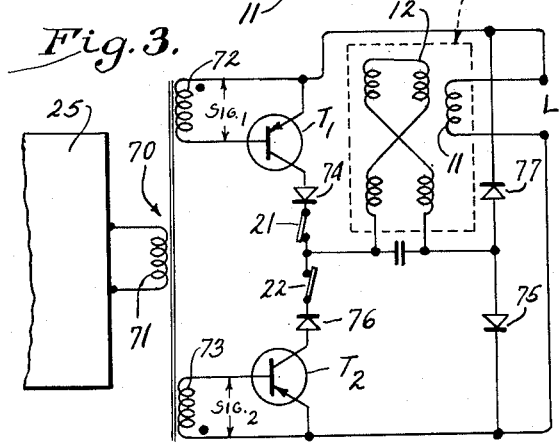
INVENTORS
Charles A. Cibelius Jr.
Donald K. Schaeve
Alfred A. Horton
BY Wolfe, Hubbard, Voit + Osann
ATTORNEYS INVENTORS
Charles A. Cibelius Jr.
Donald K. Schaeve
Alfred A. Horton
BY Wolfe, Hubbard, Voit & Osann
ATTORNEYS

United States Patent Office 3,119,956
Patented Jan. 28, 1964

3,119,956
CONTACTLESS TWO PHASE MOTOR CONTROL WITH LIMIT SWITCHING
Charles A. Cibelius, Jr., Donald K. Schaeve, and Alfred A. Horton, Rockford, Ill., assignors to Barber-Colman Company, Rockford, Ill., a corporation of Illinois
Filed Sept. 16, 1959, Ser. No. 840,418
5 Claims. (Cl. 318—208)

The present invention relates to motor control and more particularly to contactless means for controlling the speed and direction of rotation of a two-phase motor while providing limit switch protection at the ends of the range of movement.

In the field of automatic control it is common to employ two phase motors having a main winding and a control winding with the direction of rotation being dependent upon the relative phase and magnitude of the current applied to the control winding and without use of switching contacts. Unfortunately, such motors are not well adapted for the use of protective limit switches since the opening of the circuit at the ends of the stroke by either one of the switches opens the circuit to the control winding thus disabling the motor for operation in the opposite direction upon reversal in phase of the control signal.

Accordingly it is an object of the present invention to provide a control arrangement for a two phase motor which overcomes the above disadvantages and in which opening of a limit switch at the end of the stroke does not prevent energization of the control winding for reverse rotation.

It is another object of the present invention to provide a contactless motor control arrangement in which the windings are fully active in both directions of rotation thereby producing maximum torque for a given physical motor size. Stated in other words, it is an object to provide a motor control arrangement having provision for use of limit switches but in which a control winding may be employed without necessity for using taps or alternative windings.

It is a further object of the invention to provide a contactless two phase motor control arrangement having provision for limit switching in which the control winding is fed by half waves of voltage. More specifically, it is an object of the invention to provide a two-phase motor control arrangement with limit switching in which control signals of predetermined phase are fed to the control winding through only one of said limit switches and control signals of opposite phase are fed to the control winding solely through the opposite limit switch for rotation of the motor in its respective directions.

It is still another object of the present invention to provide a motor control arrangement employing a two phase motor protected by limit switches which is well suited for use with transistors to puroduce a relatively high power driving unit for actuation of a driven member while under the control of a control signal of extremely low power capability. It is one of the detailed objects of the invention to provide a power actuator in the form of a compact package including a two phase driving motor and protective limit switches which requires only the supplying of line voltage and a low power control signal which is phase related to the line voltage.

Other objects and advantages of the invention will become apparent upon reading the attached detailed description and upon reference to the drawings in which:

FIGURE 1 is a schematic diagram of a control system for a two phase electric motor constructed in accordance with the present invention;

FIG. 1a is a diagram showing significant voltages and currents in the system of FIG. 1 for both positively and negatively phased control signals;

FIG. 2 shows a preferred form of motor employed with the system of FIG. 1 including a driving train, driven member, and associated limit switches;

FIG. 3 is a schematic diagram of an alternate form of circuit incorporating the present invention;

FIG. 3a is a diagram similar to FIG. 1a for understanding the operation of FIG. 3;

Figure 4:
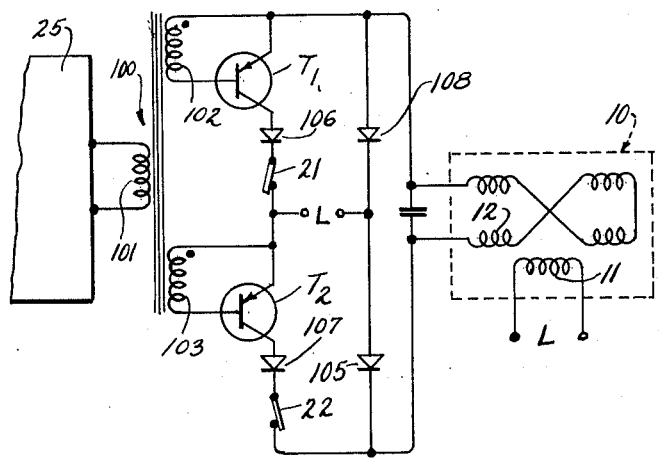
FIG. 4 is a schematic diagram of a further form of motor control system embodying the present invention.

While the invention has been described in connection with several preferred embodiments, it will be understood that we do not intend to be limited to the illustrated embodiments but intend to cover the various alternative and equivalent forms of the invention falling within the spirit and scope of the appended claims.

Turning now to FIGS. 1 and 2, there is shown in simplified form a typical motor control arrangement constructed in accordance with the present invention. The motor indicated at 10 will be recognized as a type of motor in common use in the control of dampers, valves and the like in automatic control systems. For the details of construction reference is made to Lilja Patent No. 2,010,869. It will be noted that the motor has a main winding 11 and a control winding 12 comprised of four separate portions. When the motor is employed as a shaded pole motor, the windings are used in diagonal pairs whereas when the motor is employed as a two phase motor, the various portions of the winding are connected in series so that they present a single set of control terminals. Mounted on suitable bearings is a rotor 13 having a pinion 14 which drives a driving train 15. At the terminal element of the driving train is a driven member 16 which is swingable through a range of movement defined by a first limit switch 21 and a second limit switch 22. These limit switches are normally closed and arranged to open and thus break the circuit when engaged by the driven member 16.

For the purpose of controlling rotation of the motor in one direction or the other, a signal source 25 is employed. This source is shown diagrammatically since it may take many different forms. It will suffice to say that the source 25 produces a control signal consisting of alternating voltage which is variable in magnitude and also variable in phase with respect to the phasing of an A.-C. supply line. In the drawings the supply line is indicated by the letter L. In a simplified control circuit the control signal may, if desired, be of constant magnitude and simply reversible in phase for driving of the motor 10 in one direction or the other. The terms "positive" and "negative" phase will be used in the discussion which follows to denote the two possible phase conditions relative to the phasing of the supply line. Apart from the variation or reversal of phase it will be appreciated that the frequency of the source 25 is the same as that of the A.-C. supply line.

In accordance with the present invention the limit switches 21, 22 are both connected to the control winding 12 for feeding control signals thereto and means are interposed between the source of control signal and the limit switches for allowing only control signals of predetermined phasing to flow through each of them respectively while preventing flow of a control signal of opposite phasing so that upon opening of one of the limit switches, only the control signal of corresponding phasing is cut off (to terminate further advancement of the motor) while a control signal of opposite phasing is free to flow to said control winding through the opposite switch for rotation of the motor in the opposite direction. In the present instance this is accomplished by providing novel transistor means having its input circuit connected to the source of control signal and having an output circuit coupled to the A.-C. supply line and biased for cut-off during half of the cycle of the control signal for the feeding of half waves of control current through one of the limit switches or the other depending upon the phase of the control signal. In the circuit shown in FIG. 1, a single transistor T is employed having a base 31, an emitter 32, and a collector 33. The base-emitter circuit of the transistor is coupled to the source of control signal by a coupling transformer 34. The emitter-collector or output circuit of the transistor is coupled to the supply line L by means of a transformer 40 having a primary winding 41 and secondary windings 42, 43. The voltages in the secondary windings, indicated at $v_1$ and $v_2$, respectively, are of opposite phase as viewed by the transistor T. The central terminal 44 of the transformer secondary is connected to the collector electrode and the outer terminals are connected to the limit switches 21, 22, respectively, which feed the control winding 12 of the motor. For the purpose of preventing the setting up of short circuit or circulating current when both of the limit switches 21, 22 are closed, and also for the purpose of protecting the transistor, diodes 45, 46 oriented as shown, are provided in series with each of the limit switches.

Since the circuit described above is intended for the supplying of half waves of current through the control winding 12, a capacitor 48 is preferably arranged in shunt with the control winding for increasing the effective current therein and for improving the wave form. With a proper choice of capacitance, a matter well within the skill of the art, a condition approaching parallel resonance may be achieved.

In order to more readily understand the operation of the circuit shown in FIG. 1, reference is made to the diagram of significant voltages and currents in FIG. 1a under the conditions of positively phased and negatively phased signal voltage. FIG. 1a is a simplified diagram to show relationships rather than actual polarities. Particular reference is made to the first column which gives the positive phase condition, with the signal voltage 51 in phase with the line voltage 50. When the transistor is connected as shown without any external bias in the input circuit, the transistor cuts off during half of the cycle and may be thought of either as a class B amplifier or as a half wave switch. Thus when the instantaneous signal voltage is in the positive sense, as is assumed during the first half cycle, the output impedance of the transistor is low so that substantial current may flow in the positive sense as indicated at 52. During the first half cycle, the voltage $v_1$ in the secondary winding 42 is in the positive sense so that substantial rectified current may flow through the series circuit which includes the diode 45 and the limit switch 21, the half wave of current $i_1$ being indicated at 54. During the same half cycle the voltage $v_2$ which is induced in the second secondary winding is of opposite polarity, in other words opposed to the direction of rectification of the transistor output circuit and the diode 46, so that no current (see 56) flows through the second leg of the circuit including the limit switch 22.

In the second half of the cycle of control voltage, the control voltage applied to the transistor is in the opposite direction cutting off flow of current in the output circuit of the transistor. Thus during the condition of reverse signal voltage the transistor may be considered as a near-infinite resistance as far as its load circuit is concerned. Under such conditions no current can flow through the circuit supplying the control winding as indicated at 57, 58. The net result is to produce a series of positively phased half cycles of current 54 in the control winding 12, and the motor will continue to rotate in the "forward" direction. At the end of the range of movement the operated member 16 comes into engagement with the limit switch 21 opening the switch. With the switch open the motor will come to a stop and thus protect itself and the driving train in spite of the continued application of signal voltage 51.

It is one of the features of the present invention that opening of the limit switch 21 does not disable the motor, and the motor is still capable of being reversed by means of half cycles of current supplied through the limit switch 22. To accomplish reversal, all that is necessary is to reverse the phasing of the input signal. Referring to the second column of FIG. 1a, the reversed control signal is shown at 61. During the first half cycle thereof, the voltage being in the negative sense, cut-off is produced in the transistor so that no current can flow to the motor control winding through either leg of the circuit. In the second half cycle, the transistor becomes conductive as indicated at 62; however, the then existing voltage in the winding 42 is unfavorable so that no current tends to flow in the left hand leg of the circuit. Moreover, the limit switch 21 is, as stated, assumed to be open at this time. However, the voltage $v_2$ (see 65) during the second half of the cycle is of proper sense to produce flow of current 66 through the right hand leg of the circuit via diode 46 and limit switch 22. Since this current is, as shown, out of phase with respect to the current in the main winding 11 of the motor, the motor will proceed to turn in the opposite direction thus backing the operated member 16 away from the limit switch 21 and causing the latter to close. As long as the input signal 61 exists, the motor will continue to rotate backwardly until the operated member 16 engages the opposite limit switch 22 opening it and thus cutting off further flow of the half waves of current 66. This completes the operating cycle. In order to get the motor to turn again in the forward direction, the control signal must be reversed in phase to the condition shown at 51 in FIG. 1a.

While the circuit described in FIG. 1 has the advantage of requiring only a single transistor for operation, nevertheless it does require a transformer 20 for producing the necessary out of phase voltages $v_1$, $v_2$. The desired result may be achieved as shown in FIG. 3 by slightly modified means enabling elimination of the transformer 40. The circuit of FIG. 3 does, however, require the use of two transistors and additional isolating diodes. In this second embodiment the source 25 of control signal is fed into a coupling transformer 70 having a primary winding 71 and two secondary windings 72 and 73 polarized as shown. These windings are respectively connected to the input circuits of the transistors indicated at $T_1$, $T_2$, so that the circuit is in effect a push-pull class B amplifier. The emitter of the transistor $T_1$ is connected to one side of the line L and the collector feeds into the control winding 12 of the motor via a diode 74 and a limit switch 21. A second diode 75 completes the circuit to the other side of the supply line L.

Referring to the lower or opposite leg of the circuit of FIG. 3, the output of the transistor $T_2$ is fed to the control winding 12 of the motor via a diode 76 and limit switch 22, with the circuit being completed to the other side of the A.-C. supply line via a diode 77. It will be noted that the circuit-completing diodes 75, 77 are connected back to back across the supply line L so that they do not tend to short-circuit the supply line.

The operation of the circuit under the two conditions of in phase and out of phase control signal will be apparent from inspection of FIG. 3a. Here it will be noted that the signal 81 applied to the first transistor is in phase with the line voltage 80. When the control signal is in the positive sense, as it is during the first half of the cycle, the transistor $T_1$ is conductive as indicated at 82.

The voltage $v_1$, which is the voltage tending to produce flow of current in the output circuit of the transistor $T_1$, has a sense, as indicated at 83, such that a half wave pulse of output current flows as shown at 84. The signal 85 applied to the second transistor is, with respect to the transistor input circuit, in the same sense as that shown at 81 so that conduction occurs in the transistor $T_2$ as shown at 86. However, the voltage applied to the output circuit of the transistor $T_2$ during the first half cycle is in the opposite sense so that no current flows in the second leg of the circuit. During the second half cycle the signal voltage is such as to render both of the transistors non-conducting so no current flows. The series of half cycles of current produces motor rotation in the "positive" direction.

Continuing the explanation of FIG. 3 under the condition of a reversely phased control voltage 91, during the first half cycle the sense of the control voltage is such as to produce zero flow in the transistor output circuits. However, during the second half cycle the transistors are conductive. Nevertheless the voltage $v_1$ is not of a sense to produce current flow so that no current flows through the upper leg of the circuit (see 93, 94). However, the voltage $v_2$ tending to produce flow in the lower half of the circuit and indicated at 97 is effective to produce a half cycle of current flow 98, with a series of such half cycles producing reverse rotation. It will be apparent, then, that with an input signal 81, the motor will rotate in one direction and with a reversed input signal 91, the motor will tend to rotate in the opposite direction until stopped by one or the other of the limit switches. Just as in the case of the circuit described above, the opening of one of the limit switches does not disable the motor for reversal; on the contrary, simply reversing the phase of the input signal causes half waves of current of opposite phase to be fed through the opposite limit switch so that the motor backs away from the limit position reclosing the limit switch for normal and continued operation.

A further modification of circuit which may be employed without departing from the present invention is shown in FIG. 4. Such circuit, similarly to that in FIG. 3, is distinguished by the fact that it does not require a coupling transformer between the line and the transistor output circuits. On the contrary, a transformer 100 is used having an input winding 101 and secondary windings 102, 103 feeding the input circuits of transistors $T_1$, $T_2$, respectively, and polarized as shown. The output circuit of the transistor $T_1$ may be traced as follows: Starting with the right hand line terminal, the circuit proceeds through a diode 105 and thence through the control winding 12 of the motor 10 to the emitter electrode of the transistor $T_1$. The collector is connected to the opposite side of the A.-C. line via a diode 106 and the limit switch 21. Turning to the lower portion of the circuit, the collector circuit includes a diode 107, the limit switch 22, and the winding 12 of the motor, with the circuit being completed to the A.-C. supply line via a diode 108.

Figure 4A:
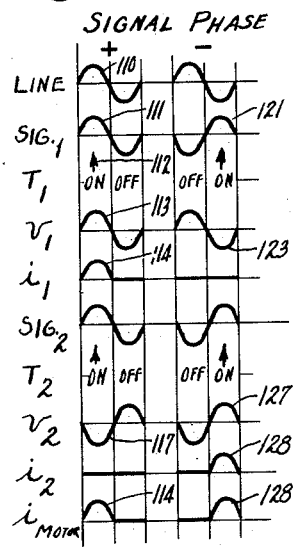
FIG. 4a is a diagram showing the significant voltages and currents applicable to FIG. 4.

The operation of the circuit shown in FIG. 4 is quite similar to that of FIG. 3. Referring to FIG. 4a, the control signal 111 in the "positive" phase condition is in phase with the voltage in the line 110 so that the transistor $T_1$ is conductive during the first half cycle (see 112). Since the voltage 113 tending to produce current flow in the output circuit of the transistor $T_1$ during the half cycle is of favorable polarity, a half wave pulse of current 114 flows through the motor control winding. However, during the first half cycle the voltage 117 tending to produce current flow in the output circuit of the transistor $T_2$ is of unfavorable polarity so that no current flow results. In the second half cycle of the control signal both of the transistors are cut off, i.e., rendered non-conducting so that no current flows through the motor control winding.

During the "negative" phase condition of the control signal indicated at 121, both of the transistors are non-conducting during the first half cycle. During the second half cycle, while the transistor $T_1$ is conductive, the voltage 123 applied to the transistor output circuit is in a sense opposite to that required for conduction so that no current flows in the upper leg of the circuit. However, referring to the lower leg of the circuit, the voltage 127 is properly phased to produce conduction so that a half wave pulse of current 128 flows through the motor winding 12. Just as in the case of the preceding circuit, persistence of a control signal of one phasing causes continued rotation of the motor until the end of the range of movement is reached and the limit switch opens. Reversal requires reversing the phase of the control signal to produce motor rotation in the opposite direction.

Figure 5:
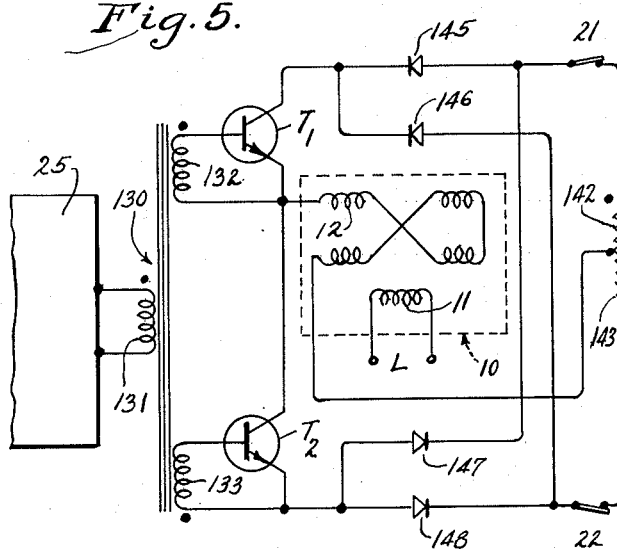
FIG. 5 is a schematic design of a still further motor control system included within the scope of the present invention.

In the embodiments shown in FIGS. 3 and 4 the signal voltages applied to the base elements of the two transistors are in phase and the voltages applied to the collectors are respectively out of phase. However, it will be understood by one skilled in the art that the invention is not limited to this condition but includes control systems having transistors in two legs of the circuit with the voltages applied to the bases being out of phase and that applied to the collectors being in phase. Such an arrangement is shown in FIG. 5. Here the source 25 feeds a coupling transformer 130 having a primary winding 131, a first secondary winding 132 and a second secondary winding 133. The latter windings are coupled to the inputs of transistors $T_1$ and $T_2$ respectively with reversed polarity as indicated by the polarity "dots."

For the purpose of exciting the output circuits of transistors $T_1$, $T_2$ a supply transformer 140 is provided having a primary winding 141 connected to the line and secondary windings 142, 143. Diodes 145, 146 are interposed between the ends of the respective secondary windings and the collector of transistor $T_1$ so that the emitter-collector circuit is excited by full wave rectified current. Similarly, the output circuit of the transistor $T_2$ has diodes 147, 148 connected to the opposite ends of the transformer windings so that the second transistor is also furnished with full wave rectified current. The circuit from each of the transistors to the center tap of the transformer is completed through the control winding 12 of the motor 10. Since the control winding is connected to the emitter of the first transistor and the collector of the second, the transistor output currents flowing through the control winding are in opposite sense.

In carrying out the present invention a limit switch 21 is interposed in series with the supply winding 142 which feeds the diodes 145, 147 and an opposite limit switch 22 is interposed in series with the secondary supply winding 143 which feeds the diodes 146, 148. It will be apparent to one skilled in the art as the discussion proceeds that the diodes 145, 147 supply complementary half waves of current for rotation of the motor in one direction while the diodes 146, 148 produce half waves of current for rotation of the motor in the opposite direction. Thus, the limit switch 21 is effective to limit rotation in one direction, while leaving the supply circuit completed through diodes 146, 148 for rotation of the motor in the opposite direction upon reversal of the control signal. The converse is true with respect to the limit switch 22. In both cases it will be noted that opening of the limit switch does not disable the motor for control purposes, the advantage which is inherent in the embodiments previously discussed.

Figure 5A:
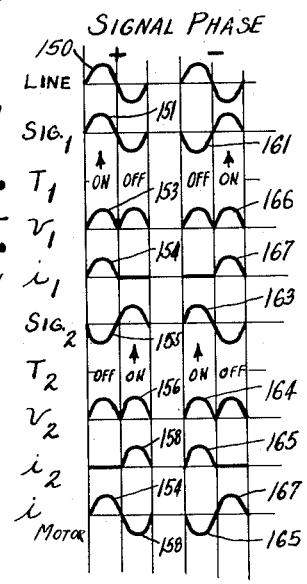
FIG. 5a is a diagram showing the sense of the currents and voltages applicable thereto.

The operation of the control system shown in FIG. 5 will be more readily understood upon inspection of the phase and voltage relationships set forth in the accompanying FIG. 5a. In the first column in this figure the line voltage, which is taken as a reference, is indicated at 150. During the first half cycle the signal voltage 151 applied to the input circuit of the transistor T₁ is such as to cause the transistor to conduct. At this time a pulse of voltage 153 is applied through the diode 145 and limit switch 21 to produce a pulse of current 154 through the motor control winding. During this half cycle the input signal 155 to the second transistor is such as to produce cut-off so that no conduction takes place in the second transistor. However, during the suceeding half cycle it is the transistor T₂ which is conductive. Voltage is applied to the output circuit of the transistor via the diode 147 as indicated at 156 to produce a pulse of current 158. Because current is supplied from the transistors T₁, T₂ in opposite sense, the net effect is to produce a full wave of current in the motor control winding 12 to produce rotation of the motor in the forward or positive directin.

This rotation continues until the motor opens the limit switch 21, thereby opening the circuit to the diodes 145, 147 which have conducted current during the first and second half cycles respectively, bringing the motor to rest.

Upon reversal of the control signal is indicated at 161 the first transistor T₁ is cut off. However, since the input signal is applied to the second transistor T₂ in the opposite sense, as indicated at 163, the second transistor is conductive. During the first half cycle, the output circuit of the transistor T₂ is excited through diode 148 by a pulse of voltage 164, resulting in a half cycle pulse of current 165. In the second half cycle the situation is reversed, that is, the transistor T₁ is turned on and the transistor T₂ is turned off. Focusing attention upon the transistor T₁, the output circuit is excited by a half wave of voltage 166 fed through diode 146 to produce a half wave pulse of current 167. Since, as mentioned, the transistors feed current to the motor control winding in opposite sense, the two half waves of current 165, 167 combine to produce a full wave of current to produce rotation of the motor in the reverse direction. Such rotation continues as long as a control signal of negative phase is applied and until the opposite limit switch 22 is opened. This opens the circuit to the diodes 146, 148 so that further rotation in the stated direction is halted. The motor remains at rest untilt he signal is again reversed.

One advantage in the circuit shown in FIG. 5 is that full waves of current are applied to the control winding 12 for rotation in each of the two directions rather than half cycles, thus producing somewhat more efficient operation of the motor with greater available torque.

It will be apparent that the circuits overcome one of the conventional disabilities of contactless two phase motor control, permitting this type of motor to be employed with protective limit switches. Thus usage of the motor may be extended into high torque operations where stalling of the motor at the end of the range of movement cannot be tolerated. Accordingly the arrangement is particularly suitable for remote operation of various control elements such as dampers, valves and the like with a degree of reliability sufficient for the most exacting commercial and military purposes.

It is one of the features of the present invention that appreciable power may be controlled with only low power control signals because of the relatively high degree of amplification provided by the transistors. The entire unit may be produced as a package, including the associated limit switches, and requiring only the connection of an A.-C. supply line and leads for carrying the control or input signal.

We claim as our invention:

1. In a motor control arrangement, the combination comprising a motor having a main winding and a control winding, means connecting an A.-C. supply line to the main winding, a source of control signal for said control winding and having positive or negative phasing with respect to the current in the main winding for forward and reverse rotation of the motor, a driven member coupled to the motor for movement between limit positions, normally closed limit switches arranged to be opened by the driven member upon reaching its respective limit positions and each being connected to the control winding for feeding control signals thereto, and amplifier means controlled by the source of control signal and supplied with current from the supply line for energizing the control winding, said amplifier means including means for directing amplified control signal of one phase to the control winding solely through one of said limit switches and for directing amplified control signal of opposite phase to the control winding solely through the opposite limit switch.

2. In a motor control arrangement, the combination comprising a motor having a main winding and a control winding, means connecting an A.-C. supply line to the main winding, a source of control signal having positive or negative phasing with respect to the current in the main winding for forward and reverse rotation of the motor, a driven member coupled to the motor for movement between limit positions, normally closed limit switches arranged to be opened by the driven member upon reaching its respective limit positions and each being connected to the control winding, transistor means having its input circuit connected to the source of control signal and having an output circuit coupled to the A.-C. supply line and to the limit switches, said transistor means being so constructed and arranged that amplified signal current of one phase is fed solely through one of said limit switches and amplified signal current of opposite phase is fed solely through the other of said limit switches so that upon opening of one of said limit switches only the control signal of corresponding phasing is cut off while a control signal of opposite phasing is free to flow to said control winding through the opposite switch for rotation of the motor in the opposite direction.

3. A reversing drive comprising a motor having a main winding and a control winding;

means for connecting a source of alternating current voltage of given frequency across the main winding;

a driven member coupled to said motor for movement between forward and reverse limit positions;

normally closed forward and reverse limit switches respectively arranged to open when the drive member reaches its respective forward or reverse limit position;

and means for applying a half-wave control voltage of said frequency across said control winding, said control voltage having a forward or reverse phase relative to the voltage across the main winding for respective forward or reverse rotation of the motor;

said last named means including first and second rectifying means;

and rectifying amplifier means having input and output circuits, said output circuit being split to couple said alternating current source in series with said control winding in respective forward and reverse phase paths across said amplifier output, said forward phase path including in series therewith said forward limit switch and said first rectifying means, said reverse phase path including in series therewith said reverse limit switch and said second rectifying means, said forward and reverse rectifying means being respectively poled to permit current flow in the same direction as in the rectifying amplifier means, and to block respective reverse and forward current flow, and said input circuit including means for applying a control signal of said given frequency and selected phase to cause output circuit half-wave current flow alternatively through the forward or reverse phase split path whereby opening of the limit switch in one split path does not prevent current flow in the other split path.

4. A reversing drive comprising
a motor having a main winding and a control winding;
means for connecting a source of alternating current voltage of given frequency across the main winding;
a driven member coupled to said motor for movement between forward and reverse limit positions;
normally closed forward and reverse limit switches respectively arranged to open when the drive member reaches its respective forward or reverse limit position;
and means for applying a full-wave control voltage of the same frequency across said control winding,
said control voltage having a forward or reverse phase relative to the voltage across the main winding for respective forward or reverse rotation of the motor;
said last named means comprising
first and second sets of two rectifiers, and
first and second rectifying amplifier means each having input and output circuits,
said first and second output circuits each being split to couple said alternating current source in series with said control winding in respective forward and reverse phase paths across the amplifier output,
said forward phase paths each being connected in series with one of said first set of two rectifiers and jointly being connected in series with said forward limit switch,
said reverse phase paths each being connected including in series with one of said second set of two rectifiers and jointly being connected in series with said reverse limit switch,
said rectifier means being respectively poled for the same direction of current flow in their respective split paths as the rectifying amplifier means,
and said input circuits including means for applying a control signal at said given frequency of selected phase to cause output half-wave current flow alternatively through the forward or reverse phase split paths of each output circuit whereby either forward or reverse phase full-wave current flows through the control winding subject to interruption by only one of the limit switches without said one limit switch preventing flow of opposite phase current in said control winding.

5. A reversing drive comprising
a motor having a main winding and a control winding;
means for connecting a source of alternating current voltage of given frequency across the main winding;
a driven member coupled to said motor for movement between forward and reverse limit positions;
normally closed forward and reverse limit switches respectively arranged to open when the drive member reaches its respective forward or reverse limit position;
and means for applying a half-wave control voltage of the same frequency across said control winding,
said control voltage having a forward or reverse phase relative to the voltage across the main winding for respective forward or reverse rotation of the motor;
said last named means comprising
first and second rectifiers, and
first and second transistor amplifiers each having input and output circuits,
said first output circuit coupling said alternating current source in series with said control winding and said forward limit switch and said first rectifier in forward phase paths across said first amplifier output,
said second output circuit coupling said alternating current source in series with said control winding and said reverse limit switch and said second rectifier in a reverse phase path across said second amplifier output,
said rectifier means being respectively poled for the same direction of current flow in their output circuits split paths as their respective amplifiers,
and said input circuits including means for applying a control signal at said given frequency of selected phase to cause output half-wave current flow alternatively through the output circuit of the first or second amplifier whereby the control field winding current is subject to interruption by only one of the limit switches without said one limit switch preventing flow of opposite phase current in said control winding.

References Cited in the file of this patent
UNITED STATES PATENTS

| | | |
|---|---|---|
| 2,272,769 | Crago | Feb. 10, 1942 |
| 2,287,045 | Lilja | June 23, 1942 |
| 2,365,709 | Lilja | Dec. 26, 1944 |
| 2,830,244 | Davis | Apr. 8, 1958 |
| 2,887,642 | Ehret et al. | May 19, 1959 |
| 2,912,632 | Turtil | Nov. 10, 1959 |
| 2,924,763 | Cibelius | Feb. 9, 1960 |